(12) United States Patent
Fujiwara et al.

(10) Patent No.: US 7,538,051 B2
(45) Date of Patent: May 26, 2009

(54) OPTICAL GLASS, PREFORM FOR PRESS MOLDING AND OPTICAL ELEMENT

(75) Inventors: Yasuhiro Fujiwara, Akishima (JP); Xuelu Zou, Akishima (JP)

(73) Assignee: Hoya Corporation, Tokyo (JP)

( * ) Notice: Subject to any disclaimer, the term of this patent is extended or adjusted under 35 U.S.C. 154(b) by 409 days.

(21) Appl. No.: 10/504,595

(22) PCT Filed: Oct. 29, 2003

(86) PCT No.: PCT/JP03/13845

§ 371 (c)(1),
(2), (4) Date: Oct. 26, 2004

(87) PCT Pub. No.: WO2004/041741

PCT Pub. Date: May 21, 2004

(65) Prior Publication Data

US 2005/0143250 A1    Jun. 30, 2005

(30) Foreign Application Priority Data

Nov. 8, 2002 (JP) ............................. 2002-325289

(51) Int. Cl.
*C03C 3/17* (2006.01)
*C03C 3/19* (2006.01)
*C03C 3/21* (2006.01)

(52) U.S. Cl. ..................... 501/48; 501/47; 501/46; 501/902; 501/903

(58) Field of Classification Search .................. 501/48, 501/47, 46, 902, 903
See application file for complete search history.

(56) References Cited

U.S. PATENT DOCUMENTS

| | | | | |
|---|---|---|---|---|
| 3,979,322 A | * | 9/1976 | Alexeev et al. | 252/301.6 P |
| 4,481,023 A | * | 11/1984 | Marechal et al. | 65/64 |
| 4,734,118 A | * | 3/1988 | Marechal et al. | 65/102 |
| 4,747,864 A | * | 5/1988 | Hagerty et al. | 65/102 |
| 4,929,387 A | * | 5/1990 | Hayden et al. | 252/301.4 P |
| 4,969,944 A | * | 11/1990 | Marechal et al. | 65/104 |
| 5,032,315 A | * | 7/1991 | Hayden et al. | 252/301.4 P |
| 5,526,369 A | | 6/1996 | Hayden et al. | |
| 5,607,886 A | | 3/1997 | Onozawa | |
| 2007/0111875 A1 | * | 5/2007 | Fujiwara | 501/47 |

FOREIGN PATENT DOCUMENTS

| | | |
|---|---|---|
| JP | 57-118045 | 7/1982 |
| JP | 60-171244 | 9/1985 |
| JP | 02-188442 | 7/1990 |
| JP | 10-158027 | 6/1998 |

* cited by examiner

*Primary Examiner*—Karl E Group
*Assistant Examiner*—Elizabeth A Bolden
(74) *Attorney, Agent, or Firm*—Nixon & Vanderhye P.C.

(57) ABSTRACT

An optical glass has optical constants represented by a refractive index (nd) of 1.46 to 1.58 and an Abbe's number (vd) of 65 to 74, has excellent hot preform shapeability, low softenability and excellent climate resistance, and comprises, by mol %, 45 to 65% of $P_2O_5$, 8 to 19% of $Al_2O_3$, 5 to 30% of MgO, 1 to 25% of a total of $Li_2O$, $Na_2O$ and $K_2O$, 0 to 16% of $B_2O_3$, 0 to 25% of ZnO, 0 to 25% of CaO, 0 to 25% of SrO, 0 to 30% of BaO, 0 to 10% of $La_2O_3$, 0 to 10% of $Gd_2O_3$, 0 to 10% of $Y_2O_3$, 0 to 10% of $Yb_2O_3$ and 0 to 10% of $Lu_2O_3$, and the total content of the above components of the optical glass is at least 95%.

15 Claims, 1 Drawing Sheet

OPTICAL GLASS, PREFORM FOR PRESS MOLDING AND OPTICAL ELEMENT

This application is the US national phase of international application PCT/JP03/013845 filed 29 Oct. 2003, which designated the US and claims priority to JP Application No. 2002-325289 filed 8 Nov. 2002. The entire contents of these applications are incorporated herein by reference.

1. Technical Field

The present invention relates to an optical glass, a preform for press-molding (press-moldable preform), a process for the production of the preform, an optical element and a process for the production of the element. More specifically, the present invention relates to an optical glass that has optical constants represented by a refractive index (nd) of about 1.5 and an Abbe's number (vd) of about 70 and is suitable for precision mold shaping, a preform formed of the above optical glass for use in press-molding, a process for the production of the preform, an optical element having the above optical properties, and a process for the production of the optical element.

2. Background Art

As a method of highly productively mass-producing optical elements formed of a glass such as an aspherical lens, there is known a method called precision press-molding (or optics molding). In this method, an aspherical lens can be formed without polishing and lapping the aspherical surface of the aspherical lens. That is, it can be formed by heating and softening a shaped glass material formed of an optical glass, which glass material is called a press-moldable preform, and pressing the preform with a press mold to transfer a molding surface of the press mold to the glass.

Meanwhile, an optical glass having optical constants represented by a refractive index (nd) of about 1.5 and an Abbe's number (vd) of about 70 is a very useful glass for optical designing due to its low-dispersion property. As the above glass, for example, a glass containing phosphorus and fluorine is known (refer to e.g., JP-A-10-158027). When an optical element such as an aspherical lens can be produced from the above glass by precision press-molding, optical elements useful for optical designing can be highly productively provided to markets.

The practical method of producing a preform for press-molding is largely classified into a method in which a molten glass having a predetermined weight is shaped into a preform formed of the glass having the above weight while the molten glass is in a molten and softened state (hot-shaping method) and a method in which a preform having a predetermined weight is cut from a glass block or the like and the glass surface is polished (cold processing method). Of these methods, the hot shaping method makes it possible to mass-produce preforms having high weight accuracy and having a form suitable for precision press-molding and is therefor excellent over the cold processing method, so long as no devitrification or striae take place during the shaping of a glass into preforms.

However, when a preform formed of a glass containing fluorine for imparting the glass with the above optical constants is hot-shaped, striae are considerably liable to take place due to the vaporization of the fluorine. One of the above hot-shaping methods is that a preform having a weight corresponding to the weight of a press-molded article (product) is shaped directly from a molten glass. Therefore, the striae cannot be removed from the preform by cutting or polishing, which eventually means that a preform having striae from the hot-shaping method leads to a defective product.

For carrying out excellent precision press-molding, it is required to impart a glass material for press-molding with low softenability. For allowing an optical element to perform its function for a long period of time, further, it is required to impart the glass material with excellent climate resistance.

DISCLOSURE OF THE INVENTION

Under the circumstances, it is a first object of the present invention to provide an optical glass having optical constants represented by a refractive index (nd) of 1.46 to 1.58 and an Abbe's number (vd) of 65 to 74 and also having hot preform shapeability, low softenability and excellent climate resistance.

It is a second object of the present invention to provide a press-moldable preform which has the above optical constants, low softenability and excellent climate resistance and which is free of striae, and a process for the production thereof.

It is a third object of the present invention to provide an optical element formed of the above optical glass excellent in climate resistance and a process for producing an optical element from the above preform by press-molding.

For achieving the above objects, the present inventors have made diligent studies and as a result have found that the above objects can be achieved by an optical glass that has the above optical constants and which has a specific composition, or an optical glass that further has a specific climate resistance index. On the basis of the above finding, the present invention has been completed.

That is, the present invention provides;

(1) an optical glass having a refractive index (nd) of 1.46 to 1.58 and an Abbe's number (vd) of 65 to 74, and comprising, by mol %, 45 to 65% of $P_2O_5$, 8 to 19% of $Al_2O_3$, 5 to 30% of MgO, 1 to 25% of a total of $Li_2O$, $Na_2O$ and $K_2O$, 0 to 16% of $B_2O_3$, 0 to 25% of ZnO, 0 to 25% of CaO, 0 to 25% of SrO, 0 to 30% of BaO, 0 to 10% of $La_2O_3$, 0 to 10% of $Gd_2O_3$, 0 to 10% of $Y_2O_3$, 0 to 10% of $Yb_2O_3$ and 0 to 10% of $Lu_2O_3$, the total content of said components being at least 95% (to be referred to as "optical glass I" hereinafter), (2) an optical glass having a refractive index (nd) of 1.46 to 1.58 and an Abbe's number (vd) of 65 to 74, and comprising, by mol %, 45 to 65% of $P_2O_5$, 8 to 19% of $Al_2O_3$, 5 to 30% of MgO, 1 to 25% of a total of $Li_2O$, $Na_2O$ and $K_2O$, 0 to 16% of $B_2O_3$, 0 to 25% of ZnO, 0 to 25% of CaO, 0 to 25% of SrO, 0 to 30% of BaO, 0 to 10% of $La_2O_3$, 0 to 10% of $Gd_2O_3$, 0 to 10% of $Y_2O_3$, 0 to 10% of $Yb_2O_3$ and 0 to 10% of $Lu_2O_3$, the total content of said components being at least 95%, the optical glass having climate resistance represented by the ratio of intensity of scattered light to intensity of transmitted light (scattered light intensity/transmitted light intensity) that is 0.08 or less when one of optically polished surfaces of a sample formed of said optical glass is exposed to white light after the sample is held in air having a temperature of 65° C. and a relative humidity of 90% for 1 week, the two optically polished surfaces being in parallel with each other (to be referred to as "optical glass II" hereinafter), (3) a press-moldable preform formed of the optical glass recited in the above (1) or (2) (to be referred to as "preform I" hereinafter), (4) a press-moldable preform which is obtained by shaping a molten glass having a predetermined weight and is formed of a glass containing $P_2O_5$ and having said weight, said glass being an optical glass containing, by mol %, 8 to 19% of $Al_2O_3$, 5 to 30% of MgO and 1 to 25% of a total of $Li_2O$, $Na_2O$ and $K_2O$ and having a refractive index (nd) of 1.46 to 1.58 and an Abbe's number (vd) of 65 to 74 (to be referred to as "preform II" hereinafter), (5) a process of shaping a molten glass having a predetermined weight to produce a press-moldable preform formed of a glass containing $P_2O_5$ and having said weight, the process using, said glass, an optical glass containing, by mol %, 8 to 19% of $Al_2O_3$, 5 to 30% of MgO and 1 to 25% of a total of $Li_2O$, $Na_2O$ and $K_2O$ and having a refractive index (nd) of 1.46 to 1.58 and an Abbe's number (vd) of 65 to 74, (6) an optical element formed of the optical glass recited in the above (1) or (2), (7) a process for producing an optical element, which comprises heating and softening the press-moldable preform recited in the above (3) or (4) or the press-moldable preform prepared by the process recited in the above (5) and press-molding the preform, (8) the process for producing an optical element as recited in the above (7), wherein the press-moldable preform is introduced into a press mold, said preform and the press mold are heated together, and the preform is press-molded into the optical element, and (9) the process for producing an optical element as recited in the above (7), wherein the press-moldable preform is heated and then introduced into the press mold to press-mold the preform into the optical element.

BEST MODE FOR CARRYING OUT THE INVENTION

The optical glass of the present invention will be explained first.

For achieving the object to provide an optical glass having optical constants represented by refractive index (nd) of 1.46 to 1.58 and an Abbe's number (vd) of 65 to 74 and having a hot preform-shapeability, low softenability and excellent climate resistance together, particularly, an optical glass suitable for precision press-molding, the present inventors have made diligent studies, and on the basis of the consequently obtained result, the present invention has been completed.

As glass components, $Al_2O_3$ and MgO are introduced, an increase in contents of $Li_2O$, $Na_2O$, $K_2O$ and $B_2O_3$ in the glass is suppressed and the content of $SiO_2$ is controlled, whereby the glass can be improved in climate resistance to a great extent. Further, when a large amount of $P_2O_5$ is introduced, not only $P_2O_5$ itself contributes to an improvement of the glass in climate resistance, but also it is possible to introduce into the glass a larger amount of $Al_2O_3$ that has a large effect on improving the glass in climate resistance among components for improving the glass in climate resistance. Further, the content of $SiO_2$ can be controlled, and, preferably, $SiO_2$ is excluded from the glass components, so that there can be suppressed the occurrence of a precipitate that causes devitrification of the glass surface at a high temperature at a high humidity.

Alkali metal oxides such as $Li_2O$, $Na_2O$ and $K_2O$ are components for decreasing the glass transition temperature and imparting the glass with excellent precision press-shapeability, and they also work to decrease the viscosity of a molten glass (glass melt) to a range in which the glass is excellently shaped into a preform in the hot preform-shaping. It is therefore required to determine the contents of the alkali metal oxides so that the above precision press moldability and the shapeability into a preform can be attained in a range where excellent climate resistance can be attained. Further, for preventing the occurrence of striae during the hot-shaping of a preform, no fluorine is introduced.

Further, arsenic is a substance that may damage the shaping surface of a mold during the precision press-molding and which is undesirable in view of detrimental effects on environments, so that no arsenic is introduced.

On the basis of the above finding, an optical glass that permits excellent precision press-molding and hot preform shaping while maintaining high climate resistance has been found by optimizing the contents of $P_2O_5$, $Al_2O_3$, MgO, other RO components (R represents Ca, Sr, Ba and Zn) and $M_2O_3$ components (M is La, Gd, Y, Yb and Lu), which are components for improving the glass in climate resistance, and by optimizing the contents of $Li_2O$, $Na_2O$ and $K_2O$ as components that decrease the climate resistance but cause the glass transition temperature and the melt viscosity at a preform-shaping temperature to decrease.

<Optical Glass I>

The optical glass I is an optical glass having optical constants represented by a refractive index (nd) of 1.46 to 1.58 and an Abbe's number (vd) of 65 to 74, and comprising, by mol %, 45 to 65% of $P_2O_5$, 8 to 19% of $Al_2O_3$, 5 to 30% of MgO, 1 to 25% of a total of $Li_2O$, $Na_2O$ and $K_2O$, 0 to 16% of $B_2O_3$, 0 to 25% of ZnO, 0 to 25% of CaO, 0 to 25% of SrO, 0 to 30% of BaO, 0 to 10% of $La_2O_3$, 0 to 10% of $Gd_2O_3$, 0 to 10% of $Y_2O_3$, 0 to 10% of $Yb_2O_3$ and 0 to 10% of $Lu_2O_3$, the total content of said components being at least 95%. Preferably, the optical glass I does not contain none of F, As and $SiO_2$.

The reasons for limitation of contents of the components in the above glass composition are as follows. In addition, a content (%) of each glass component stands for mol % hereinafter.

$P_2O_5$ is a main component for constituting the network structure of the glass. When the content thereof is less than 45%, the glass is degraded in thermal stability, and it is also degraded in climate resistance. When the content of $P_2O_5$ exceeds 65%, the viscosity of the glass melt increases, so that the hot preform shaping is difficult. The content of $P_2O_5$ is therefore limited to 45 to 65%. The content thereof is preferably in the range of 55 to 65%.

$Al_2O_3$ is a component that constitutes the glass network structure and at the same time improves the glass in climate resistance. When the content thereof is less than 8%, the glass is degraded in climate resistance to a great extent. When the content of $Al_2O_3$ is over 19%, the glass is degraded in thermal stability, and further, the viscosity of the glass melt increases, so that the hot preform shaping is difficult. The content of $Al_2O_3$ is therefore limited to 8 to 19%. The content thereof is preferably in the range of 10 to 16%.

MgO is a component for modifying the glass and is also a component for improving the glass in climate resistance. When the content of MgO is less than 5%, the glass is greatly poor in climate resistance. When the content of MgO is over 30%, the glass is degraded in thermal stability and also tends to be degraded in climate resistance. The content of MgO is therefore limited to 5 to 30%. The content thereof is preferably in the range of 7 to 25%.

Alkali metal oxides $R_2O$ (R represents Li, Na and K) have an effect on decreasing the glass transition temperature and the liquidus viscosity, and are components essential for improvements in precision press-molding and hot preform shaping. When the total content of $Li_2O$, $Na_2O$ and $K_2O$ is less than 1%, the glass transition temperature increases, so that the precision press-molding is difficult. Further, the viscosity of the glass melt in the hot preform shaping increases, so that the hot preform shaping is also difficult. When the total content of the above alkali metal oxides exceeds 25%, the glass is poor in climate resistance. The above total content is therefore limited to 1 to 25%. The above total content is preferably in the range of 2 to 20%, more preferably 2 to 18%.

In addition, the content of each of $Li_2O$, $Na_2O$ and $K_2O$ is preferably 0 to 25%, more preferably 0 to 20%, still more preferably more than 0% but not more than 18%.

$B_2O_3$ has an effect on improving the glass in climate resistance when added in a small amount, and also has an effect on attaining the low-dispersion of optical properties of the glass. When the content of $B_2O_3$ exceeds 16%, the glass is degraded in thermal stability and is also degraded in climate resistance. The content of $B_2O_3$ is therefore limited to 0 to 16%. The content thereof is preferably more than 0% but not more than 16%, more preferably 0.5 to 10%.

ZnO, CaO, SrO and BaO are components for modifying the glass and are used for adjusting various properties of the glass. When the content of even one of ZnO, CaO and SrO exceeds 25%, the glass is degraded in thermal stability, or the viscosity of the glass at its liquidus temperature is caused to increase, so that the precision press-moldability or the hot preform shapeability is impaired. The content of each of ZnO, CaO and SrO is therefore limited to 0 to 25%, and it is preferably 0 to 20%. BaO has an effect on improving the glass in climate resistance. However, when the content thereof exceeds 30%, it is difficult to obtain the desired optical constants. The content of BaO is therefore limited to 0 to 30%, and it is preferably in the range of 0 to 25%.

$La_2O_3$, $Gd_2O_3$, $Y_2O_3$, $Yb_2O_3$ and $Lu_2O_3$ are optional components having an effect on improving the glass in climate resistance. When the content of even one of $La_2O_3$, $Gd_2O_3$, $Y_2O_3$, $Yb_2O_3$ and $Lu_2O_3$ exceeds 10%, it is difficult to obtain the desired optical constants, and further, the viscosity of the glass at its liquidus temperature tends to increase. For obtaining the desired optical constants and excellent hot preform shapeability, therefore, the content of each of $La_2O_3$, $Gd_2O_3$, $Y_2O_3$, $Yb_2O_3$ and $Lu_2O_3$ is limited to 0 to 10%.

In the optical glass I, further, it is determined that the total content of the above components is at least 95%, for imparting the glass with the desired optical constants, excellent precision press-moldability, excellent hot preform shapeability, excellent climate resistance, and the like. For further improving the glass in the above properties, the above total content is preferably at least 98%, more preferably at least 99%.

In addition to the above components, a defoaming agent such as $Sb_2O_3$ may be added. When $Sb_2O_3$ is incorporated, the total content of the above components and $Sb_2O_3$ is preferably at least 98%, more preferably at least 99%, particularly preferably 100%.

When the glass in a molten state is handled or treated, for example, during hot performing shaping, F vaporizes from a glass surface to cause striae. Further, in press-molding (particularly, precision press-molding), F reacts with the molding surface of a press mold to damage the molding surface. It is therefore desirable to incorporate no F.

As is a component having toxicity and posing an environmental problem. Further, it is a substance that is liable to damage the molding surface of a press mold in press-molding (particularly, precision press-molding). Like F, it is therefore desirable to incorporate no As.

$SiO_2$ causes a precipitation substance that causes the devitrification of a glass surface when an end product is exposed to a high temperature and a high humidity. It is required to prevent the occurrence of the above precipitation substance, since it degrades the performance of the optical glass. Desirably, no $SiO_2$ is therefore incorporated.

Glass compositions preferred for the optical glass I will be summarized below.

(Preferred Glass Composition 1)

In the compositional ranges of the optical glass I, a preferred glass composition 1 contains 55 to 65% of $P_2O_5$, 10 to 16% of $Al_2O_3$, 7 to 25% of MgO, 2 to 20% of a total of $Li_2O$, $Na_2O$ and $K_2O$, 0 to 16% of $B_2O_3$, 0 to 20% of ZnO, 0 to 20% of CaO, 0 to 20% of SrO and 0 to 25% of BaO. Further, in the above preferred composition 1, the total content of the above components and $Sb_2O_3$ is more preferably at least 96%, still more preferably at least 98%, further more preferably at least 99%, particularly preferably 100%.

(Preferred Glass Composition 2)

In the compositional ranges of the optical glass I, a preferred glass composition 2 contains 55 to 65% of $P_2O_5$, 10 to 16% of $Al_2O_3$, 7 to 25% of Mgo, 2 to 18% of a total of $Li_2O$, $Na_2O$ and $K_2O$, more than 0% but not more than 16% of $B_2O_3$, 0 to 10% of ZnO, 0 to 10% of CaO, 0 to 10% of SrO and 0 to 25% of BaO. Further, in the above preferred composition 2, the total content of the above components and $Sb_2O_3$ is more preferably at least 96%, still more preferably at least 98%, further more preferably at least 99%, particularly preferably 100%.

(Preferred Glass Composition 3)

In the compositional ranges of the optical glass I, a preferred glass composition 3 contains 55 to 65% of $P_2O_5$, 10 to 16% of $Al_2O_3$, 7 to 25% of MgO, more than 0.5% but not more than 18% of $Li_2O$, more than 0.5% but not more than 18% of $Na_2O$, more than 0.5% but not more than 18% of $K_2O$, the total content of $Li_2O$, $Na_2O$ and $K_2O$ being 2 to 18%, 0.5 to 10% of $B_2O_3$, 0 to 10% of ZnO, 0 to 10% of CaO, 0 to 10% of SrO and 0 to 25% of BaO. Further, in the above preferred composition 3, the total content of the above components and $Sb_2O_3$ is more preferably at least 96%, still more preferably at least 98%, further more preferably at least 99%, particularly preferably 100%.

(Preferred Glass Composition 4)

In the compositional ranges of the optical glass I, a preferred glass composition 4 contains $P_2O_5$, $Al_2O_3$, MgO, $Li_2O$, $Na_2O$, $K_2O$ and $B_2O_3$ as essential components, and the total content of the above essential components and $Sb_2O_3$ is preferably at least 96%, more preferably at least 98%, still more preferably at least 99%, particularly preferably 100%.

(Preferred Glass Composition 5)

Out of the above preferred glass compositions 1 to 3, a preferred composition 5 contains $P_2O_5$, $Al_2O_3$, MgO, $Li_2O$, $Na_2O$, $K_2O$ and $B_2O_3$ as essential components, and the total content of the above essential components and $Sb_2O_3$ is preferably at least 96%, more preferably at least 98%, still more preferably at least 99%, particularly preferably 100%.

<Optical Glass II>

The optical glass II of the present invention is an optical glass having a refractive index (nd) of 1.46 to 1.58 and an Abbe's number (vd) of 65 to 74, and comprising, by mol %, 45 to 65% of $P_2O_5$, 8 to 19% of $Al_2O_3$, 5 to 30% of MgO, 1 to 25% of a total of $Li_2O$, $Na_2O$ and $K_2O$, 0 to 16% of $B_2O_3$, 0 to 25% of ZnO, 0 to 25% of CaO, 0 to 25% of SrO, 0 to 30% of BaO, 0 to 10% of $La_2O_3$, 0 to 10% of $Gd_2O_3$, 0 to 10% of $Y_2O_3$, 0 to 10% of $Yb_2O_3$ and 0 to 10% of $Lu_2O_3$, the total content of said components being at least 95%, the optical glass having climate resistance represented by the ratio of intensity of scattered light to intensity of transmitted light (scattered light intensity/transmitted light intensity) that is 0.08 or less when one of optically polished surfaces of a sample formed of said optical glass is exposed to white light after the sample is held in air having a temperature of 65° C. and a relative humidity of 90% for 1 week, the two optically polished surfaces being in parallel with each other.

The optical glass II has the same glass composition and the same preferred glass compositions as those of the optical glass I except for the absence or presence of $SiO_2$ and the above climate resistance. The optical glass II will be therefore explained below mainly with regard to the absence or presence of $SiO_2$ and the above climate resistance.

The climate resistance of the optical glass II can be represented by the ratio of the intensity of scattered light to the intensity of transmitted light when the glass placed under specific conditions is exposed to white light. The above climate resistance is quantitatively determined as follows. First, there is provided a sample that is formed of the optical glass II and has two optically polished surfaces positioned in parallel with each other. When no sufficiently large sample can be prepared in the evaluation of a small preform or optical element, a sufficiently large sample formed of the same composition may be used. The above optically polished surfaces refer to surfaces that are finished so as to have a surface roughness Ra approximately equivalent to the optical-function surface of an optical element such as a lens. Specifically, as the standard, there can be employed a polished state where the surface roughness Ra is sufficiently small, for example, $\frac{1}{10}$ or less of the wavelength of the short wavelength side in a visible light region. As a sample, a sample in a clean state is used. The above sample is held, for example, in a constant-temperature and constant-humidity chamber (containing air as an atmosphere) in which the temperature is maintained at 65° C. and the relative humidity is maintained at 90%, for 1 week. The above air is desirably clean air, for example, air having a higher cleanness than class 1000, preferably air having a higher cleanness than class 100. After the sample is held for 1 week, the optically polished surface of the sample is vertically exposed to white light (C light source or standard light C), and incidence light and transmitted light of the white light are measured for intensities. A value obtained by deducting the intensity of the transmitted light from the intensity of the incidence light is taken as the intensity of scattered light, and the ratio of the intensity of the scattered light to the intensity of the transmitted light (scattered light intensity/transmitted light intensity) is calculated. When measured in the above manner, the optical glass II shows that the ratio of the intensity of the scattered light to the intensity of the transmitted light (scattered light intensity/transmitted light intensity) is a value of 0.08 or less. As described above, the optical glass II shows climate resistance represented by a scattered light intensity/transmitted light intensity ratio of 0.08 or less. Above all, the optical glass II preferably has a scattered light intensity/transmitted light intensity ratio of 0.03 or less.

The reason why the above limitation is imposed on the climate resistance of the optical glass II will be explained below. When a glass has climate resistance inferior to the climate resistance defined by the above range, the glass shows a high velocity of corrosion of the glass or suffers formation of a reaction product on the glass surface due to water drops or water vapors adhering to the glass and various chemical components such as gases in a use environment, or the so-called chemical durability of the glass is low. When such a glass is used as an optical element, the corrosion of the glass or the product formed on the glass surface may cause a foreign matter to form on the optical glass surface and may decrease optical properties such as a transmittance, so that the glass is undesirable as an optical glass composition. In contrast, a glass having climate resistance defined by the above range can give practical and highly reliable optical elements. For imparting the glass with the above climate resistance, preferably, $SiO_2$ is not incorporated as well as the optical glass I. Further, it is preferred to incorporate none of F and As.

For achieving the object of the present invention and for providing an optical glass having higher stability and excellent qualities, an optical glass having (satisfying) the requirements of the optical glass I and the optical glass II is the most preferred.

In the optical glass I and the optical glass II, it is desirable to preclude radioactive substances such as uranium and thorium and harmful substances such as lead and cadmium.

For imparting the optical glass I and the optical glass II with high transmittance in a wide wavelength region from the short wavelength side of the visible light region to the long wavelength side, desirably, Cu and the like as components for coloring the glass are not incorporated.

The properties common to the optical glass I and the optical glass II will be explained below.

(Water Resistance)

When an optical element is produced from an optical glass having low water resistance, water drops or water vapors adhering to the glass surface and various chemical components such as gases in a use environment corrode the glass or a foreign substance is formed on the surface, so that the optical element is degraded in optical properties such as a transmittance. Therefore, the water resistance is an essential property together with the climate resistance for obtaining a highly reliable optical glass.

The water resistance of the optical glass is defined as follows. A glass having a mass (unit: gram) equivalent to its specific gravity is pulverized into a powder having a particle size of approximately 425 to 600 µm, and the powder is measured for a mass. This mass is taken as a mass A. This powdered glass is boiled in pure water for 60 minutes, and then the powered glass is measured for a mass B. An index Dw for the water resistance is a value obtained by deducting mass B from mass A, dividing the difference by mass A and expressing the quotient by a percentage. Specifically, the above powdered glass in an amount (unit: gram) equivalent to the specific gravity thereof is placed in a platinum basket, and the basket is immersed in a round-bottomed flask made of a quartz glass with 80 ml of pure water having a pH of 6.5 to 7.5 in it, followed by boiling under the above conditions.

The optical glass of the present invention preferably has water resistance represented by a Dw of less than 0.25%, more preferably has a water resistance represented by a Dw of 0.10% or less.

The optical glass having the above water resistance can stably maintain optical properties such as excellent transmittance, and the like.

(Liquidus Temperature and Viscosity at Liquidus Temperature)

The liquidus temperatures of the optical glass I and the optical glass II and the viscosities thereof at the liquidus temperatures will be explained below. When a preform for precision press molding is hot-shaped, the glass is required to undergo no devitrification in a shaping temperature range, and it is required to have a viscosity suitable for the shaping. For this purpose, the liquidus temperature (LT) of the optical glass is preferably 1,100° C. or lower. For obtaining a stable glass having the above desired properties, it constitutes the standard that the optical glass I and the optical glass II have a liquidus temperature of 850° C. or higher.

For carrying out the hot-shaping of a preform excellently, the viscosity of the glass during the shaping is preferably 1 to 80 dPa·s, more preferably 6 to 60 dPa·s. When the glass viscosity at 1,100° C. exceeds 80 dPa·s, and if an attempt is made to increase the temperature further in order to decrease the viscosity for carrying out the hot preform shaping, glass components vaporize during the shaping and surface striae are liable to take place. Further, it is made difficult to separate a molten glass having a predetermined weight from a glass melt flowing out from a flow pipe without a cutting blade. Therefore, the optical glass I and the optical glass II preferably show a viscosity, measured at 1,100° C., of 80 dPa·s or less, and the viscosity thereof is more preferably in the range of 1 to 80 dPa·s. The viscosity thereof at 1,100° C. is still more preferably in the range of 6 to 60 dPa·s, further more preferably in the range of 6 to 50 dPa·s.

In a method in which a molten glass having a predetermined weight is shaped into a preform in a state where the molten glass is floated by the application of gas pressure (called "float shaping"), it is preferred to use an optical glass having the above liquidus temperature and the above viscosity property at the liquidus temperature.

In a method in which a preform for precision press-molding a microlens is produced by float shaping, it is also preferred to use an optical glass having the above liquidus temperature and the above viscosity property at the liquidus temperature.

(Glass Transition Temperature)

In press-molding of a glass such as precision press-molding, a press mold for the press-molding is exposed to high temperatures and high pressures. When a glass to be press-molded can have a viscosity at which the glass is press-moldable at a lower temperature, a load on the press mold and a mold release film provided on the molding surface of the mold is decreased. It is therefore desirable that a glass material for press-molding, particularly, precision press-molding should have low glass transition temperature (Tg). The glass transition temperature (Tg) of the optical glass I and the optical glass II is preferably 580° C. or lower, more preferably 560° C. or lower. For obtaining a glass excellent in stability and durability, it constitutes the standard that the optical glasses I and II have a glass transition temperature (Tg) of at least 330° C.

(Refractive Index (nd) and Abbe's Number (vd))

Both the optical glasses I and II preferably have a refractive index (nd) of 1.46 to 1.58, preferably 1.48 to 1.58, and have an Abbe's number (vd) of 65 to 74, preferably more than 65 but not more than 74, more preferably 66 to 74.

The preform for press-molding and the process for the production thereof will be explained below.

The preform for press-molding refers to a glass shaped material having a weight equivalent to the weight of a press-molded article (end product). The preform has a proper form shaped depending upon the form of press-molded article. The form of the preform includes, for example, a spherical form and the form of an ellipsoid of revolution. The preform is heated so as to have a viscosity at which the preform is press-moldable into a product, and then press-molded.

<Preform I>

The preform I for press-molding (press-moldable preform I), provided by the present invention, is formed of the optical glass I or the optical glass II. The preform I is preferably a shaped material that is obtained by shaping a molten glass having a predetermined weight and which has the above weight. The thus-obtained preform has a characteristic feature that it does not require machine processes such as cutting, polishing, lapping, and the like. That is, the entire surface of the preform I is formed in a manner in which a glass in a molten state is solidified. Concerning a preform to be machined, it is required to anneal a glass before machining so that the strain of the glass is reduced to such an extent that the glass does not break. However, the above preform does not require the annealing for the above machining.

Further, for providing the above preform with a smooth and clean surface, a preform formed in a floated state produced by application of gas pressure is preferred.

The preform I is formed of the optical glass I or the optical glass II, so that an optical element having predetermined optical constants can be produced by press-molding. Further, since the preform I is formed of the glass excellent in climate resistance and water resistance, the surface of the preform stored does not easily deteriorate. In the precision press-molding, the optical-function surface (surface that reflects light, transmits light, diffracts light or refracts light to exhibit a function as an optical element) of an optical element is formed by transferring the molding surface of a mold without machining the surface. If the surface of a preform to be precision press-molded deteriorates and if an optical-function surface is formed on the deteriorated surface by transfer, the resultant optical element inevitably becomes a defective product since no deteriorated portion can be removed by machining after the precision press-molding. Since, however, the preform I can retain the surface in a good state, the above problem can be prevented. Further, since the preform I is excellent in climate resistance and water resistance, an optical element obtained from the preform 1 by press-molding, particularly, precision press-molding is also excellent in climate resistance and water resistance, and there can be provided a highly reliable optical element.

Further, the preform I is formed of the optical glass I or the optical glass II, so that it is excellent in devitrification resistance, hot shapeability and precision press-moldability. The preform I is therefore easy to handle as a preform for precision press-molding.

<Preform II>

The press-moldable preform II of the present invention is obtained by shaping a molten glass having a predetermined weight and is formed of a glass containing $P_2O_5$ and having said weight, said glass being an optical glass containing, by mol %, 8 to 19% of $Al_2O_3$, 5 to 30% of MgO and 1 to 25% of a total of $Li_2O$, $Na_2O$ and $K_2O$ and having a refractive index (nd) of 1.46 to 1.58 and an Abbe's number (vd) of 65 to 74.

The preform II has a characteristic feature that it has high weight accuracy without machining. That is, the entire surface of the preform II is as well formed in a manner in which a glass in a molten state is solidified.

The above $P_2O_5$, $Al_2O_3$ and MgO are components for improving the preform in climate resistance, and the above $Li_2O$, $Na_2O$ and $K_2O$ are components for imparting the glass with a low glass transition temperature. However, $Li_2O$, $Na_2O$ and $K_2O$ are also components that decrease the climate resistance of the glass. Therefore, the content of $Al_2O_3$ is limited to 8 to 19%, the content of MgO is limited to 5 to 30%, and the total content of $Li_2O$, $Na_2O$ and $K_2O$ is limited to 1 to 25%, for attaining climate resistance and glass transition temperature suitable for a preform and for attaining desired optical constants.

It is desirable to exclude F, since it vaporizes during hot preform shaping to cause striae to take place.

Further, As is toxic and environmentally undesirable, so that it is desirable to exclude As. Further, As has strong oxidizing activity, so that it damages the molding surface of a press mold, particularly, a mold release film, during precision press-molding. For preventing the damage of the molding surface, it is also desirable to exclude As.

Further, it is preferred to exclude $SiO_2$ for improving the preform in climate resistance.

The optical glass forming the preform II more preferably contains 45 to 65% of $P_2O_5$, 8 to 19% of $Al_2O_3$, 5 to 30% of MgO and 1 to 25% of a total of $Li_2O$, $Na_2O$ and $K_2O$, still more preferably contains 55 to 65% of $P_2O_5$, 10 to 16% of $Al_2O_3$, 7 to 25% of MgO and 2 to 20% of a total of $Li_2O$, $Na_2O$ and $K_2O$.

The optical glass forming the preform II has a refractive index (nd) of 1.46 to 1.58, preferably 1.48 to 1.58, and an Abbe's number (vd) of 65 to 74, preferably more than 65 but not more than 74, more preferably 66 to 74.

The optical glass forming the preform II is preferably the optical glass I or the optical glass II.

Further, the above preform is preferably a preform formed in a floated state produced by application of gas pressure, for providing the preform with a smooth and clean surface. Further, the preform has a surface formed of a free surface. Further, the preform is preferably free of a cut mark called a shear mark. The shear mark occurs when a molten glass that is flowing out is cut with a cutting blade. When the shear mark remains in a precision press-molded article, the article is defective in a portion having the shear mark. It is therefore preferred that the preform should be free of the shear mark.

The process for producing a preform, provided by the present invention, is a process by a so-called hot shaping method. In the hot shaping method, a molten glass having a predetermined weight is shaped into a preform having the above weight. For example, a molten glass having a predetermined weight is separated from a molten glass that flows out from a flow pipe, and the molten glass gob is shaped into a preform while the glass gob is in a soft state.

When a molten glass having a predetermined weight is separated, it is preferred to use no cutting blade for preventing the occurrence of a shear mark. The method of separation without a cutting blade includes a method in which a molten glass is dropped from a flow pipe, a method in which a forward end portion of a molten glass flow flowing out from a flow pipe is held with a support and the support is removed timely when a molten glass gob having a predetermined weight can be separated and a method in which the forward end portion of a molten glass flow is received with a receiving mold, and, timely at the above time, the receiving mold is moved downward at a speed higher than the speed of the molten glass flowing downward. In this manner, a glass can be separated at a narrow-diameter portion that takes place between the forward end side and the flow pipe side of the molten glass flow.

Then, while the obtained molten glass gob is in a soft state, it is shaped into a form suitable for press-molding. The above shaping of the molten glass gob is preferably carried out in a state where the molten glass gob or the glass gob being shaped is allowed to float by application of gas pressure. When the glass is shaped in a floated state, there can be shaped a preform whose surface is smooth and clean.

In the process for producing a preform, provided by the present invention, there is produced a preform formed of an optical glass containing $P_2O_5$, containing, by mol %, 8 to 19% of $Al_2O_3$, 5 to 30% of MgO and 1 to 25% of a total of $Li_2O$, $Na_2O$ and $K_2O$ and having a refractive index (nd) of 1.46 to 1.58 and an Abbe's number (vd) of 65 to 74.

The above optical glass preferably has a refractive index (nd) of 1.48 to 1.58 and preferably has an Abbe's number (vd) of more than 65 but not more than 74, more preferably 66 to 74.

The functions and contents of the above components are as explained with regard to the above preform II. Like the preform II, preferably, the above optical glass contains none of F and As.

Further, for improving the preform in climate resistance, it is preferred to exclude $SiO_2$.

The above optical glass preferably has the same composition as that explained with regard to the above preform II. Further, the process for producing a preform, provided by the present invention, is suitable for producing a preform formed of the optical glass I or the optical glass II. Further, it is also suitable for producing a preform for precision press-molding.

The process for producing an optical element will be explained below.

The optical element of the present invention is formed of the optical glass I or the optical glass II. In the present invention, the glass constituting the optical element is the optical glass I or the optical glass II, so that the optical element has the properties of the above optical glass I or II. Since the optical glass I or II has desired optical constants (refractive index (nd) of 1.46 to 1.58 and Abbe's number (vd) of 65 to 74) and excellent climate resistance, the optical element of the present invention comes to have high reliability for a long period of time. Further, the high water resistance of the optical glass I or II contributes to the high reliability of the optical element.

The optical element of the present invention includes, for example, lenses such as a spherical lens, an aspherical lens and a microlens, a diffraction grating, a lens with a diffraction grating, a lens array, a prism, and the like. Desirably, the above optical element is a product formed by heating and softening the preform and precision press-molding it into an optical element.

The above optical element may have an optical thin film such as an anti-reflection film, a total reflection film, a partial reflection film or a film having spectral properties, as required.

In the process for producing an optical element, provided by the present invention, the above preform I, the above preform II or the press-moldable preform produced by the above process for producing a preform for press-molding (a press-moldable preform) is heated, softened and press-molded into the optical element. In the present invention, preferably, the above preform is heated, softened and precision press-molded into the optical element.

According to the present invention, the preform has excellent press-moldability, particularly, excellent precision press-moldability, so that there can be highly productively produced optical elements having predetermined optical constants (refractive index (nd) of 1.46 to 1.58 and Abbe's number (vd) of 65 to 74). Further, the preform having excellent climate resistance is used, whereby there can be also produced an optical element that can retain high reliability for a long period of time.

The optical element produced according to the production method of the present invention is the same as the above optical element.

The process for producing an optical element, provided by the present invention, includes the following two embodiments. In the first embodiment, the preform for press-molding is introduced into a press mold, the preform and the shaping mold are heated together and the preform is press-molded into an optical element, and in the second embodiment, the heated preform for press-molding is introduced into a press mold to press-mold the preform into an optical element.

In the first embodiment, for example, a plurality of press molds are provided, preforms are consecutively introduced to each mold, and the steps of heating, press-molding and annealing are consecutively carried out. In this method, the press-molding can be carried out when the glass and the mold are in a thermal-equilibrium state or in a state relatively close to such a state, so that highly accurate molding can be carried out, or products having various forms can be produced by molding.

In the second embodiment, for example, a minimum set of press molds are provided, preliminarily heated preforms are consecutively introduced into the molds, and the preforms are press-molded, annealed and taken out of the molds. In this method, press-molded articles can be productively produced with a minimum number of molds.

In the precision press-molding, a heated and softened preform is press-molded with a press mold having a molding surface having a predetermined form, to precisely transfer the form of the above molding surface to the glass. The thus-obtained press-molded article comes to have a form equivalent to, or remarkably similar to, the form of an end product, and the surface formed by the transfer of the form of the molding surface of the above mold has a surface accuracy equivalent to the surface accuracy of an end product. Therefore, a molding surface having an inversion form of a surface form of the aspherical surface of an aspherical lens or the grating of a diffraction grating is formed on a mold, and the precision press-molding is carried out with the mold, whereby a surface having the above aspherical surface or grating can be formed without polishing and lapping. In addition to the surface having an aspherical surface or grating, the form of a molding surface of a shaping mold is transferred to the optically functioning surface of an optical element whereby an optical-function surface can be highly productively produced without machining. In the precision press-molding, an optical element can be produced by press-molding alone without any machining process. Alternatively, part or the whole of an optical-function surface is formed by press-molding, and a portion that can be easily machined, may be machined. For example, centering a lens is conducted with machining process.

In the precision press-molding, desirably, the press-molding is carried out in a non-oxidizing atmosphere such as a nitrogen gas atmosphere or an atmosphere of a mixture of a nitrogen gas and a hydrogen gas for reducing damage that may be caused on a press mold by oxidation. The press mold, the mold release film and the pressing condition can be selected from those that are known, as required.

The thus-obtained optical element is annealed as required before practical use.

EXAMPLES

The present invention will be explained in detail with reference to Examples hereinafter, while the present invention shall not be limited by these Examples.

Examples 1-25

As raw materials for glass components, corresponding oxides, carbonates, sulfates, nitrates, phosphates, fluorides, hydroxides, etc., in an amount of 250 to 300 g were weighed in predetermined amount ratios shown in Table 1 and fully mixed to prepare a formulated batch. The batch was placed in a platinum crucible and melted at 1,100 to 1,300° C. with stirring in air for 2 to 4 hours. After the glass was melted, a glass melt (molten glass) was cast into a 40×70×15 mm carbon mold and allowed to cool to a glass transition temperature. Immediately thereafter, the glass was placed in an annealing furnace and allowed to cool to room temperature. The thus-obtained glass was observed through a microscope, to show no precipitation of a crystal.

With regard to each of the glasses obtained as described above in these Examples, optical constants (refractive index nd and Abbe's number vd), a ratio of (intensity of scattered light/intensity of transmitted light), a glass transition temperature (Tg), a sag temperature (Ts), a liquidus temperature (LT), a viscosity at 1,100° C., a specific gravity and Dw as an index for water resistance were measured or determined. Table 2 shows the results. Concerning the ratio of (intensity of scattered light/intensity of transmitted light) as an index for climate resistance, the measurement therefor was carried out a plurality of times, and a maximum value of the results was taken as a ratio of (intensity of scattered light/intensity of transmitted light). Table 2 also shows a minimum value of the above results.

Measurements of the refractive index (nd), the Abbe's number (vd), the glass transition temperature (Tg), the specific gravity, the intensity of scattered light and the intensity of transmitted light were carried out as follows.

(1) Refractive index (nd) and Abbe's number (vd)

An optical glass obtained at a gradual-cooling temperature-decrease rate of −30° C./h.

(2) Glass transition temperature (Tg) and sag temperature (Ts)

A sample was measured with a thermo-mechanical analyzer supplied by Rigakudenki K.K. at a temperature elevation rate of 4° C./minute.

(3) Specific gravity

A sample was measured according to an Archimedean method.

(4) Intensity of scattered light/intensity of transmitted light

A sample was measured with an automatic hazemeter (TC-IIIDPK) supplied by Tokyo Denshoku. The optical condition was standard light C of JIS K7105 integrating-sphere method, and a halogen lamp 12V, 50W, 2000 H was used as a light source.

TABLE 1

| | Composition (mol %) | | | | | | | | | | | |
|---|---|---|---|---|---|---|---|---|---|---|---|---|
| Ex. | $P_2O_5$ | $Al_2O_3$ | MgO | $Li_2O$ | $Na_2O$ | $K_2O$ | $B_2O_3$ | CaO | SrO | BaO | $La_2O_3$ | Total |
| 1 | 58.0 | 14.0 | 13.0 | 3.0 | 3.0 | 6.0 | 3.0 | 0.0 | 0.0 | 0.0 | 0.0 | 100.00 |
| 2 | 59.0 | 14.0 | 12.0 | 3.0 | 3.0 | 6.0 | 3.0 | 0.0 | 0.0 | 0.0 | 0.0 | 100.00 |
| 3 | 60.0 | 12.0 | 13.0 | 3.0 | 3.0 | 6.0 | 3.0 | 0.0 | 0.0 | 0.0 | 0.0 | 100.00 |
| 4 | 58.0 | 15.0 | 12.0 | 3.0 | 3.0 | 6.0 | 3.0 | 0.0 | 0.0 | 0.0 | 0.0 | 100.00 |

TABLE 1-continued

| | Composition (mol %) | | | | | | | | | | | |
|---|---|---|---|---|---|---|---|---|---|---|---|---|
| Ex. | P$_2$O$_5$ | Al$_2$O$_3$ | MgO | Li$_2$O | Na$_2$O | K$_2$O | B$_2$O$_3$ | CaO | SrO | BaO | La$_2$O$_3$ | Total |
| 5 | 60.0 | 14.0 | 12.0 | 2.0 | 3.0 | 6.0 | 3.0 | 0.0 | 0.0 | 0.0 | 0.0 | 100.00 |
| 6 | 58.0 | 14.0 | 13.0 | 3.0 | 3.0 | 7.0 | 2.0 | 0.0 | 0.0 | 0.0 | 0.0 | 100.00 |
| 7 | 58.0 | 15.0 | 12.0 | 3.0 | 3.0 | 7.0 | 2.0 | 0.0 | 0.0 | 0.0 | 0.0 | 100.00 |
| 8 | 58.0 | 12.0 | 22.0 | 2.0 | 2.0 | 2.0 | 2.0 | 0.0 | 0.0 | 0.0 | 0.0 | 100.00 |
| 9 | 60.0 | 10.0 | 10.0 | 0.0 | 0.0 | 15.0 | 5.0 | 0.0 | 0.0 | 0.0 | 0.0 | 100.00 |
| 10 | 55.0 | 15.0 | 10.0 | 0.0 | 0.0 | 15.0 | 5.0 | 0.0 | 0.0 | 0.0 | 0.0 | 100.00 |
| 11 | 55.0 | 10.0 | 10.0 | 15.0 | 0.0 | 0.0 | 10.0 | 0.0 | 0.0 | 0.0 | 0.0 | 100.00 |
| 12 | 55.0 | 10.0 | 10.0 | 10.0 | 5.0 | 0.0 | 10.0 | 0.0 | 0.0 | 0.0 | 0.0 | 100.00 |
| 13 | 55.0 | 10.0 | 10.0 | 5.0 | 5.0 | 5.0 | 10.0 | 0.0 | 0.0 | 0.0 | 0.0 | 100.00 |
| 14 | 60.0 | 10.0 | 10.0 | 5.0 | 0.0 | 12.0 | 3.0 | 0.0 | 0.0 | 0.0 | 0.0 | 100.00 |
| 15 | 55.0 | 10.0 | 15.0 | 5.0 | 0.0 | 12.0 | 3.0 | 0.0 | 0.0 | 0.0 | 0.0 | 100.00 |
| 16 | 60.0 | 10.0 | 10.0 | 5.0 | 0.0 | 5.0 | 10.0 | 0.0 | 0.0 | 0.0 | 0.0 | 100.00 |
| 17 | 60.0 | 15.0 | 10.0 | 0.0 | 0.0 | 10.0 | 5.0 | 0.0 | 0.0 | 0.0 | 0.0 | 100.00 |
| 18 | 57.1 | 9.5 | 19.0 | 4.8 | 0.0 | 0.0 | 9.5 | 0.0 | 0.0 | 0.0 | 0.0 | 100.00 |
| 19 | 60.0 | 12.0 | 15.0 | 0.0 | 0.0 | 10.0 | 3.0 | 0.0 | 0.0 | 0.0 | 0.0 | 100.00 |
| 20 | 60.0 | 8.0 | 19.0 | 0.0 | 0.0 | 10.0 | 3.0 | 0.0 | 0.0 | 0.0 | 0.0 | 100.00 |
| 21 | 61.0 | 16.0 | 5.0 | 0.0 | 0.0 | 18.0 | 0.0 | 0.0 | 0.0 | 0.0 | 0.0 | 100.00 |
| 22 | 62.5 | 16.5 | 5.0 | 0.0 | 0.0 | 15.0 | 0.0 | 0.0 | 0.0 | 0.0 | 1.0 | 100.00 |
| 23 | 56.0 | 15.0 | 12.0 | 3.0 | 3.0 | 10.0 | 1.0 | 0.0 | 0.0 | 0.0 | 0.0 | 100.00 |
| 24 | 56.0 | 12.0 | 13.0 | 2.0 | 2.0 | 13.0 | 2.0 | 0.0 | 0.0 | 0.0 | 0.0 | 100.00 |
| 25 | 60.0 | 12.0 | 10.0 | 0.0 | 0.0 | 10.0 | 3.0 | 5.0 | 0.0 | 0.0 | 0.0 | 100.00 |

Ex. = Example

TABLE 2

| | | | IOSL/IOTL (%) | | Tg | Ts | Liquidus temperature | Viscosity at | Specific | Dw |
|---|---|---|---|---|---|---|---|---|---|---|
| Ex. | nd | vd | Minimum | Maximum | (° C.) | (° C.) | (° C.) | 1100° C. (dPa · s) | gravity | (%) |
| 1 | 1.52054 | 70.15 | 0.2 | 1 | 512 | 562.2 | 1000 | 36 | 2.583 | 0.07 |
| 2 | 1.52109 | 70.13 | 0.3 | 1 | 515 | 566.9 | 1010 | 37 | 2.581 | 0.04 |
| 3 | 1.52047 | 70.14 | 0.5 | 1 | 509 | 560.3 | 1020 | 29 | 2.574 | 0.05 |
| 4 | 1.52078 | 70.09 | 0.5 | 1 | 514 | 566.2 | 1000 | 41 | 2.579 | 0.04 |
| 5 | 1.52067 | 69.98 | 0.3 | 1 | 525 | 576.6 | 1030 | 43 | 2.580 | 0.04 |
| 6 | 1.52020 | 70.10 | 0.4 | 1 | 508 | 555.0 | 1000 | 29 | 2.580 | 0.04 |
| 7 | 1.52072 | 70.08 | 0.5 | 1 | 512 | 559.4 | 1000 | 33 | 2.585 | 0.03 |
| 8 | 1.51403 | 69.30 | 5.0 | 7 | 523 | 573.2 | 1020 | 41 | 2.528 | 0.06 |
| 9 | 1.51094 | 70.28 | 6.5 | 8 | 511 | 556.4 | 1020 | 9 | 2.538 | 0.17 |
| 10 | 1.51430 | 70.45 | 2.7 | 4 | 550 | 595.6 | 1100 | 16 | 2.566 | 0.13 |
| 11 | 1.52420 | 69.98 | 2.1 | 3 | 470 | 517.5 | 1030 | 24 | 2.516 | 0.09 |
| 12 | 1.52481 | 70.06 | 6.3 | 8 | 470 | 517.2 | 1030 | 23 | 2.555 | 0.07 |
| 13 | 1.52293 | 70.38 | 5.6 | 7 | 485 | 532.2 | 1030 | 19 | 2.569 | 0.06 |
| 14 | 1.51588 | 70.28 | 0.3 | 2 | 480 | 524.3 | 1020 | 8 | 2.554 | 0.10 |
| 15 | 1.51729 | 70.09 | 1.3 | 5 | 481 | 525.8 | 1020 | 9 | 2.568 | 0.07 |
| 16 | 1.52234 | 70.49 | 2.2 | 3 | 516 | 571.2 | 1040 | 48 | 2.546 | 0.05 |
| 17 | 1.51770 | 70.43 | 2.3 | 3 | 580 | 637.7 | 1060 | 64 | 2.567 | 0.04 |
| 18 | 1.52586 | 70.08 | 1.6 | 2 | 524 | 581.4 | 1050 | 53 | 2.501 | 0.04 |
| 19 | 1.51503 | 70.07 | 1.0 | 2 | 554 | 604.6 | 1040 | 36 | 2.553 | 0.05 |
| 20 | 1.51168 | 69.80 | 1.8 | 3 | 534 | 581.4 | 1020 | 21 | 2.534 | 0.14 |
| 21 | 1.51150 | 70.45 | 6.9 | 8 | 522 | 566.1 | 1010 | 57 | 2.563 | 0.05 |
| 22 | 1.51815 | 69.27 | 5.0 | 7 | 545 | 589.9 | 1040 | 68 | 2.603 | 0.03 |
| 23 | 1.52011 | 69.82 | 1.4 | 3 | 502 | 548.2 | 1030 | 17 | 2.581 | 0.11 |
| 24 | 1.51621 | 70.04 | 2.5 | 3 | 494 | 538.9 | 1000 | 8 | 2.581 | 0.13 |
| 25 | 1.51698 | 69.86 | 1.2 | 3 | 547 | 597.4 | 1050 | 40 | 2.555 | 0.06 |

Ex. = Example,
IOSL = Intensity of scattered light,
IOTL = intensity of transmitted light The glasses in all of the Examples had a refractive index (nd) of 1.46 to 1.58 and an Abbe's number (vd) of 65 to 74 and had low glass transition temperatures, excellent climate resistance and excellent water resistance. When these glasses were visually observed, no coloring was found.

Example 26

Glass materials were melted, clarified and stirred in the same manner as in Examples 1 to 25, to prepare homogeneous molten glasses. Concerning each glass, molten glass drops having a predetermined weight each were continuously dropped from a flow pipe made of a platinum alloy, to shape spherical preforms in a floated state. The preforms were formed from each of the same optical glasses as those in Examples 1 to 25.

Then, concerning each glass, a molten glass was allowed to continuously flow out from a pipe made of a platinum alloy at a constant speed, a forward end portion of the flowing molten glass was received on a receiving mold, and the receiving mold was moved downward at a speed higher than the flowing speed of the above molten glass timely as predetermined, whereby a molten glass gob having a predetermined weight was received on the receiving mold. While the molten glass gob was in a soft state, a gas was ejected from the bottom of the receiving mold to apply a gas pressure to the glass. In this manner, Preforms were formed in a floated state.

All the preforms showed none of striae, devitrification, coloring and breaking and also had clean and free surfaces. All the surfaces of each preform were formed in a manner in which the corresponding glass in a molten state was solidified.

Example 27

Figure 1:
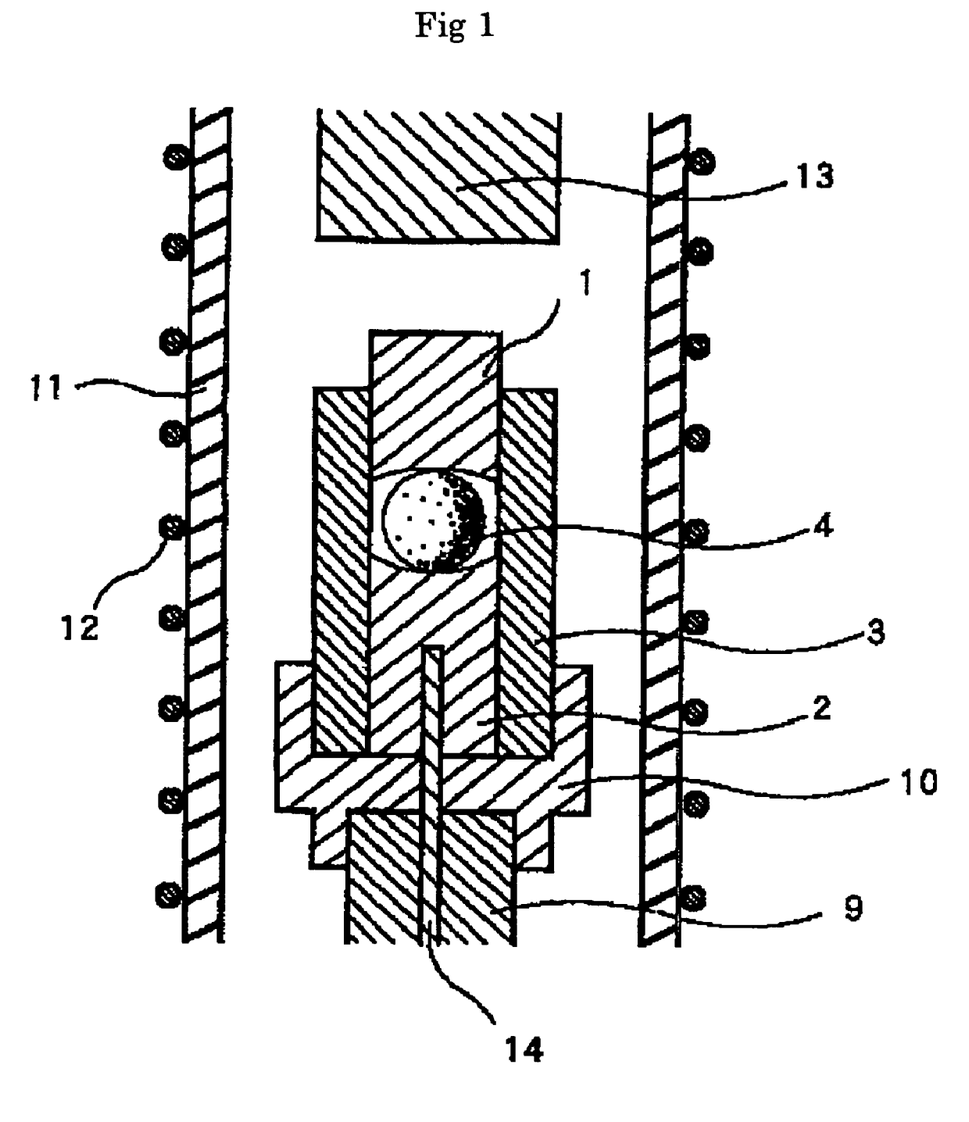
FIG. 1 is a schematic partial cross-sectional view of an example of a precision press-molding apparatus used in Example 27.

Each of the above preforms was heated, softened and precision press-molded with a pressing apparatus shown in FIG. 1, to obtain aspherical lenses. A preform 4 having a diameter of 2 to 30 mm was placed between a lower mold member 2 having a molding surface having an inversion form of an aspherical form of a lens and an upper mold member 1, and an inside of a quartz tube 11 was filled with a nitrogen atmosphere. A heater 12 was electrically powered to heat an inside of the quartz tube 11. In this manner, the preform and the shaping mold are heated and temperature-increased up to a temperature higher than the sag temperature of the glass by 20 to 60° C. While the above temperature was maintained, a press rod 13 was moved downward to press the upper mold member 1, thereby to press-mold the preform 4 in the press mold. The press-molding was carried out at a molding pressure of 8 MPa for a molding time period of 30 seconds. After the press-molding, the molding pressure was decreased, a glass molded article produced by the press-molding was gradually cooled to a temperature lower than the glass transition temperature by 30° C. in a state where the lower mold member 2 and the upper mold member 1 were in contact with each other. Then, the glass molded article was sharply cooled to room temperature, and the thus precision press-molded aspherical lens was taken out of the press mold and annealed. Aspherical lenses obtained in the above manner were highly accurate optical lenses. In FIG. 1, reference numeral 3 indicate a guide mold member, numeral 9 indicates a support rod, numeral 10 indicates a support bed, and numeral 14 indicates a thermocouple. In the above method, the preform was introduced into the press mold, and the preform and the mold were heated together. However, a preliminarily heated preform may be introduced into the mold for press-molding.

Further, various optical elements such as a spherical lens, a microlens, a lens array, a diffraction grating, and the like can be produced in the same manner as above.

An optical thin film may be formed on each of such optical elements.

INDUSTRIAL APPLICABILITY

According to the present invention, there can be provided an optical glass having optical constants represented by a refractive index (nd) of 1.46 to 1.58 and an Abbe's number (vd) of 65 to 74 and having excellent hot preform shapeability, low softenability and excellent climate resistance as well.

According to the present invention, there can be also provided a press-moldable preform that has the above optical constants, low softenability and excellent climate resistance and which is free of striae.

Further, according to the present invention, there can be provided an optical element formed of the above optical glass, and there can be provided a process for producing an optical element in which an optical element excellent in climate resistance is produced from the above preform by press-molding.

The invention claimed is:

1. A press-moldable preform which is formed of an optical glass having a refractive index (nd) of 1.46 to 1.58 and an Abbe's number (vd) of 65 to 74, and comprising, by mol %, 45 to 65% of $P_2O_5$, 12 to 19% of $Al_2O_3$, 5 to 30% of MgO, 1 to 25% of a total of $Li_2O$, $Na_2O$ and $K_2O$, 0.5 to 16% of $B_2O_3$, 0 to 25% of ZnO, 0 to 25% of CaO, 0 to 25% of SrO, 0 to 30% of BaO, 0 to 10% of $La_2O_3$, 0 to 10% of $Gd_2O_3$, 0 to 10% of $Y_2O_3$, 0 to 10% of $Yb_2O_3$ and 0 to 10% of $Lu_2O_3$, the total content of said components being at least 95% and contains no $SiO_2$.

2. A press-moldable preform which is formed of an optical glass having a refractive index (nd) of 1.46 to 1.58 and an Abbe's number (vd) of 65 to 74, and comprising, by mol %, 45 to 65% of $P_2O_5$, 12 to 19% of $Al_2O_3$, 5 to 30% of MgO, 1 to 25% of a total of $Li_2O$, $Na_2O$ and $K_2O$, 0.5 to 16% of $B_2O_3$, 0 to 25% of ZnO, 0 to 25% of CaO, 0 to 25% of SrO, 0 to 30% of BaO, 0 to 10% of $La_2O_3$, 0 to 10% of $Gd_2O_3$, 0 to 10% of $Y_2O_3$, 0 to 10% of $Yb_2O_3$ and 0 to 10% of $Lu_2O_3$, the total content of said components being at least 95% and containing no $SiO_2$, the optical glass having climate resistance represented by the ratio of intensity of scattered light to intensity of transmitted light (scattered light intensity/transmitted light intensity) that is 0.08 or less when one of optically polished surfaces of a sample formed of said optical glass is exposed to white light after the sample is held in air having a temperature of 65° C. and a relative humidity of 90% for 1 week, the two optically polished surfaces being in parallel with each other.

3. A press-moldable preform which is obtained by shaping a molten glass having a weight and is formed of a glass containing $P_2O_5$ and having said weight,
said glass being an optical glass containing, by mol %, 8 to 19% of $Al_2O_3$, 5 to 30% of MgO and 1 to 25% of a total of $Li_2O$, $Na_2O$ and $K_2O$ and containing no $SiO_2$ and having a refractive index (nd) of 1.46 to 1.58 and an Abbe's number (vd) of 65 to 74.

4. A process of shaping a molten glass having a weight into a press-moldable preform formed of a glass containing $P_2O_5$ and having said weight,
the process using, as said glass, an optical glass containing, by mol %, 8 to 19% of $Al_2O_3$, 5 to 30% of MgO and 1 to 25% of a total of $Li_2O$, $Na_2O$ and $K_2O$ and no $SiO_2$ and having a refractive index (nd) of 1.46 to 1.58 and an Abbe's number (vd) of 65 to 74.

5. An optical element formed of the optical glass recited in claim 1 or 2.

6. A process for producing an optical element, which comprises heating and softening the press-moldable preform recited in claim 3 and press-molding the preform into the optical element.

7. The process for producing an optical element as recited in claim 6, wherein the press-moldable preform is introduced into a press mold, said preform and the press-molding mold are heated together, and the preform is press-molded into the optical element.

8. The process for producing an optical element as recited in claim 6, wherein the press-moldable preform is heated and then introduced into the press mold to press-mold the preform into the optical element.

9. A press-moldable preform according to claim 1 or 2 which is obtained by shaping a molten glass.

10. A process for producing an optical element, which comprises heating and softening the press-moldable preform prepared by the process recited in claim 4 and press-molding the preform into the optical element.

11. The process for producing an optical element as recited in claim 10, wherein the press-moldable preform is introduced into a press mold, said preform and the press-molding mold are heated together, and the preform is press-molded into the optical element.

12. The process for producing an optical element as recited in claim 10, wherein the press-moldable preform is heated and then introduced into the press mold to press-mold the preform into the optical element.

13. An aspherical lens, a microlens, a lens array or a diffraction grating prepared by the process of claim 4.

14. An aspherical lens, a microlens, a lens array or a diffraction grating prepared by the process of claim 6.

15. An aspherical lens, a microlens, a lens array or a diffraction grating prepared by the process of claim 10.

* * * * *